United States Patent Office 3,251,819
Patented May 17, 1966

3,251,819
3 METHYLBUTENE POLYMERIZATION IN THE PRESENCE OF TiCl₃, A GROUP I, II OR III ORGANOMETALLIC COMPOUND AND A MINOR AMOUNT OF A LOWER OLEFIN
Arthur Donald Ketley, Olney, Md., assignor to W. R. Grace & Co., New York, N.Y., a corporation of Connecticut
No Drawing. Filed Dec. 20, 1962, Ser. No. 245,967
3 Claims. (Cl. 260—93.7)

This invention is directed to the improved process for the production of alpha olefin polymers. In particular this invention is concerned with an improved polymerization process whereby 3-methylbutene-1 is polymerized to high molecular weight polymers of improved crystallinity and in improved yield.

According to the known processes, such as disclosed in Belgian Patent 549,891, poly 3-methylbutene-1 is produced by polymerizing the monomer in the presence of a catalyst composition composed of a transition metal halide, such as titanium trihalide, and a trialkyl aluminum compound. The resultant polymer has been found to be crystalline in nature in that it exhibits a crystalline structure by X-ray analysis and is insoluble in heptane. This crystalline polymer can be processed into films and fibers with desirable characteristics such as melting point and tensile strength. However, the catalyst activity of the process of the above-mentioned Belgian patent has been found to be less than 1 gram polymer per gram $TiCl_3$ per hour. Thus, it is apparent that the process of the prior art is not conducive to commercial production of poly 3-methylbutene-1 since the yield of polymer per part of catalyst is so extremely low. The percent crystallinity which is obtained in the polymer is also lower than is desired.

For commercial production, it is necessary to have the yield of polymer per part of catalyst as high as possible. This enables one to save on catalyst cost and to also obtain the highest weight yields of polymer possible for the smallest amount of catalyst in a relatively short amount of time. It is particularly desirable that the polymer not only be formed in high yields but that the product be highly crystalline in nature in order that the optimum properties be developed in the polymer such as density, melting point, tensile strength, and stiffness.

3-methylbutene-1 is normally considered to be the most difficult monomer to polymerize with a Ziegler-Natta catalyst because of the extremely low activity exhibited by the 3-methylbutene-1 monomer. Thus, it is not practical to use low catalyst concentrations since this results in low catalyst activity and considerably lengthens the duration of the polymerization reaction. However, when high catalyst concentrations are used, the polymers produced may have a lower molecular weight than is desirable. Usage of the high catalyst concentrations also increases the catalyst cost and makes it necessary to subject the polymer to a complicated and expensive purification process.

It is an object of this invention, therefore, to provide an improved process for the polymerization of 3-methylbutene-1. It is an additional object of this invention to provide an improved process by which poly 3-methylbutene-1 can be obtained at a minimum cost and with a maximum of catalyst activity. Other objects, advantages, and features of this invention will be apparent to those skilled in the art in view of the following more detailed description of the invention.

These and other objects are attained by means of this invention in which the 3-methylbutene-1 is polymerized by contacting the monomer with a catalytic amount of a cocatalyst composition, composed of a transition metal halide and an organic metallic compound, and activating the polymerization system by the addition of a small amount of an olefin monomer which contains from 2 to 6 main chain carbon atoms. It has been found that activation of the polymerization system by the addition of traces of other olefins in amounts of less than 1% by weight of the 3-methylbutene-1, which are too small to show any evidence of copolymer formation, causes the polymerization reaction to be increased by a factor of from 5 to 8 times. The remarkable success of this improved process is demonstrated more fully in the working examples which follow.

The explanation for the success of the improved process of this invention is not clearly known. However, it is believed that because of the fact that the polymer which is being formed crystallizes very rapidly, the crystallization will take place on the surface of the catalyst. As the result of this surface crystallization, the 3-methylbutene-1 monomer can not get through to the catalyst and, therefore, no further polymerization will occur. This postulate is supported by the evidence that in the polymerization reaction the conversion of monomer to polymer reaches its maximum percentage after a very short period of time and will not increase substantially regardless of the total time of the reaction. This same phenomenon has been reported in the formation of polystyrene ("Sterospecific Polymerization of Styrene," G. M. Burnett and P. J. Tait, Polymer, volume 1, pages 158 through 160, 1960). In contrast to this, when the other alpha-olefin monomer is added to the system, a slight copolymerization which is too negligible to be evident in the infrared spectrum analysis of the final product must occur, thereby causing the crystallinity of the poly 3-methylbutene-1 to be decreased. Therefore, the polymer on the surface of the catalyst is swelled by the solvent, thereby permitting the monomer to continue to contact the catalyst and to produce the continuous polymerization of the monomer.

The particular catalyst employed does not form a specific part of this invention. The catalyst employed may be of the usual type (Ziegler-Natta) and is composed of two components, a transition metal halide and an organic metallic compound. The organic metallic compound comprises an alkyl or monohalo alkyl compound of a metal of the first to third columns of the periodic table (Mendeleeff). Lithium, beryllium, magnesium, zinc, and aluminum are examples of such compounds. The usual organic metallic compound is an aluminum alkyl in which the alkyl compound can contain from 1 to 10 carbon atoms. The term aluminum alkyl is to be understood to include monoalkyl and dialkyl aluminum mono and dihalides, as well as the aluminum trialkyls. The preferred aluminum alkyls are generally diethyl aluminum chloride, triethyl aluminum, and triisobutyl aluminum.

The transition metal compound is a metal belonging to a Group IV to VI inclusive of the Mendeleeff periodic table. Examples of such metals are titanium, zirconium, hafnium, and vanadium. The preferred transition metal halide is titanium trihalide, usually titanium trichloride. The titanium tetrachloride is usually prepared by the reduction of titanium tetrachloride with a metal alkyl compound, usually aluminum metal, at elevated temperatures.

It is also contemplated to be within the scope of this invention to utilize a catalyst composition which has as one component aluminum activated titanium trichloride. Aluminum activated titanium trichloride is a known commercial product (U.S. Patent 3,032,510). It is made by reacting titanium tetrachloride with aluminum metal at high temperatures whereby by product $AlCl_3$ is formed, the $AlCl_3$ remaining intimately dispersed throughout the $TiCl_3$, the $TiCl_3:AlCl_3$ mole ratio being about 3:1. This material is then activated by grinding in a ball mill or the like, preferably for several days.

The alpha olefin monomers used in the process of this invention to activate the polymerization system may be an olefin monomer of from 2 to 6 main chain carbon atoms. It has been found, however, that the best results are obtained when either ethylene or propylene is used as the activating monomer. However, it is to be understood that the scope of this invention is not limited thereto, but is intended to include the olefin monomers of up to 6 main chain carbon atoms.

In practicing this invention, the amount of catalyst is not critical but should be kept to a minimum in order to avoid purification problems. For example, relatively small amounts are operable to form relatively large amounts of alpha olefin polymer. Catalyst to monomer weight ratio in the range of from 1:1000 are acceptable.

The activity of the catalyst employed in the olefin polymerization on process of this invention is calculated by the conventional formula:

$$\frac{\text{grams of polymer}}{(\text{grams catalyst})(\text{time})}$$

In order to demonstrate the increased activity of this polymerization system, 3-methylbutene-1 was polymerized without the aid of the olefin monomer as an activating agent. The procedure followed is that of Example I.

Example I 1.0 gram of aluminum activated $TiCl_3$ catalyst was introduced into a Fischer-Porter aerosol bottle maintained under a nitrogen atmosphere with stirring. 1.0 ml. of triisobutyl aluminum in a 25% solution in n-heptane was next added to the reactor. The temperature was raised to 60° C. and 150 ml. of 3-methylbutene-1 was then added to the reactor. After 1.25 hours, the unreacted monomer was vented, the reactor cooled, and the solid polymer quenched in the conventional manner with isopropanol HCl-water mixture. The fine powder obtained was then filtered, washed, and dried in a vacuum oven at 60° C. An extremely fine powder (yield 38.7 grams) was obtained. The activity of the catalyst, as calculated from the formula set forth above, was found to be 31 grams polymer per gram $TiCl_3$ per hour.

Example II

In this example, the process of this invention was employed activating the polymerization system with an alpha olefin monomer. 150 ml. of the 3-methylbutene-1 monomer was added to the Fischer-Porter aerosol bottle through a drying train. The bottle was then heated to 60° C. in a constant temperature bath and stirred by a Teflon coated magnet. 1.0 gram of aluminum activated titanium trichloride and 10 ml. of tri-isobutyl aluminum (25% concentration in a solution of 10 ml. of n-heptane) were reacted in another aerosol bottle. The catalyst was then blown into the monomer by nitrogen pressure. This nitrogen pressure was vented and the dead space in the reactor was pressured to 100 p.s.i. by the addition of ethylene vapor (=4.07 gm. ethylene). After 0.33 hour, the unreacted monomer was vented, the reactor cooled, and the polymer quenched in the conventional manner with an alcohol HCl-water mixture. The resultant powder was then filtered, washed, and dried in a vacuum oven at 60° C. The yield obtained was 79.2 grams. The activity of the catalyst was calculated to be 240 grams of polymer per gram of $TiCl_3$ per hour.

Example III

The procedure of Example II was followed. 150 ml. of 3-methylbutene-1 was again added to a Fischer-Porter aerosol bottle through a drying train. The temperature of the bottle was increased to 60° C. in a constant temperature bath while undergoing stirring. 1.0 gram of titanium trichloride and 10 ml. of tri-isobutyl aluminum of 25% concentration in a solution of 10 ml. of n-heptane were reacted in another aerosol bottle. The catalyst was then blown into the monomer under nitrogen pressure. This nitrogen pressure was then vented and the dead space in the reactor was pressured to 100 p.s.i. with propylene vapor (=0.71 gm. propylene). After 0.33 hour, the unreacted monomer was vented, the reactor cooled, and the polymer quenched as in Example II. The powder obtained was then filtered, washed, and dried in a vacuum oven at 60° C. The yield obtained was 57.1 grams. The catalyst activity was computed to be 173 grams polymer per grams $TiCl_3$ per hour.

For convenience, the results of the preceding examples are summarized in Table I.

TABLE I

| Example No. | $TiCl_3$,[1] gms. | Tri-isobutyl aluminum, ml. | Temp., °C. | 3MB,[4] ml. | Reaction Time, hrs. | Activating monomers, gms. | Catalyst Act. gms. polymer (gm. $TiCl_3$) (hrs.) |
|---|---|---|---|---|---|---|---|
| 1 | 1.0 | 10 | 60 | 150 | 1.25 | | 31 |
| 2 | 1.0 | 10 | 60 | 150 | 0.33 | [2] 0.47 | 240 |
| 3 | 1.0 | 10 | 60 | 150 | 0.33 | [3] 0.71 | 173 |

[1] Aluminum activated.
[2] Ethylene.
[3] Propylene.
[4] 3 methylbutene-1.

Analysis of the results indicates that the novel process of this invention wherein the polymerization reaction is activated by the addition of the small amounts of other olefin monomers in amounts too small to produce any evidence of copolymer formation has increased the catalyst activity by a factor of from 5 to 8 times. Thus it is apparent that the process of this invention has produced a very substantial improvement in catalyst activity, thereby enabling the production of much higher yields of the polymer in shorter times of polymerization. Accordingly the process of this invention has greatly enhanced the commercial production of poly 3-methylbutene-1.

The poly-3-methylbutene-1 produced by the process of this invention has been found to have a melting point of 300° C., a modulus of elasticity of about 339,110 p.s.i at room temperature, a tensile strength of 3538 p.s.i. at 23° C., and a tension impact of 7.9 foot pounds per $inch^2$. Poly 3-methylbutene-1, possessing these desirable properties, is suitable for many uses. The polymer will find particular application in the molding of relatively stiff articles by injection, compression, or extrusion molding. This polymer is also especially suitable for usage in such fields as extruded tubing, molded articles of all kinds, fibers and yarns, and films, sheetings, and coatings and laminates.

It is to be understood that many equivalent modifications will be apparent to those skilled in the art from the reading of the foregoing disclosure without a departure from the intended concept of the invention.

I claim:
1. In the process for producing highly crystalline poly-3-methylbutene-1, in which 3-methylbutene-1 is polymerized by contact with a catalyst consisting essentially of an organometallic compound in which the metal is selected from groups I to III in combination with titanium tri- chloride, the improvement whereby the catalyst activity is increased which comprises adding to the polymerization reaction less than 1% by weight of the 3-methylbutene-1 of an alpha olefin monomer containing 2 to 3 main chain carbon atoms.

2. The process of claim 1 in which the alpha olefin monomer is ethylene.

3. The process of claim 1 in which the alpha olefin monomer is propylene.

References Cited by the Examiner

UNITED STATES PATENTS 3,029,231  4/1962  Amerongen _____ 260—87.5
3,067,183  12/1962  Hagemeyer et al. ____ 260—88.2

JOSEPH L. SCHOFER, *Primary Examiner.*

M. B. KURTZMAN, *Assistant Examiner.*